(12) United States Patent
Jechoux et al.

(10) Patent No.: US 7,440,487 B2
(45) Date of Patent: Oct. 21, 2008

(54) METHOD AND SYSTEM OF TRANSMITTING WORDS REPRESENTING TRANSMISSION PARAMETERS RESPECTIVELY ALLOCATED TO MOBILE STATIONS COMMUNICATING WITH A BASE STATION IN A MOBILE COMMUNICATION SYSTEM

(75) Inventors: Bruno Jechoux, Rennes (FR); Marian Rudolf, Rennes (FR)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/544,668

(22) Filed: Oct. 10, 2006

(65) Prior Publication Data
US 2007/0030885 A1 Feb. 8, 2007

Related U.S. Application Data

(62) Division of application No. 11/071,317, filed on Mar. 4, 2005, now Pat. No. 7,139,303, which is a division of application No. 10/460,186, filed on Jun. 13, 2003, now Pat. No. 6,895,035, which is a division of application No. 09/926,574, filed on Nov. 20, 2001, now Pat. No. 6,636,554, which is a division of application No. PCT/JP01/02133, filed on Mar. 16, 2001.

(30) Foreign Application Priority Data
Mar. 20, 2000 (EP) .................................. 00400767

(51) Int. Cl.
*H04B 1/713* (2006.01)
(52) U.S. Cl. .................... 375/141; 375/141; 370/336
(58) Field of Classification Search ................. 375/141, 375/140, 142, 145, 336, 130; 370/336, 342, 370/335, 441
See application file for complete search history.

(56) References Cited

U.S. PATENT DOCUMENTS 5,142,534 A 8/1992 Simpson et al.

(Continued)

FOREIGN PATENT DOCUMENTS

AU 199894303 B2 2/1999

(Continued)

OTHER PUBLICATIONS

Peter Jung et al., A joint detection CDMA mobile radio system concept developed within COST 231., 0-7803-2742-X/95. pp. 469-473, 1995 IEEE.

(Continued)

*Primary Examiner*—Emmanuel Bayard
(74) *Attorney, Agent, or Firm*—Oblon, Spivak, McClelland, Maier & Neustadt, P.C.

(57) ABSTRACT

Method for transmitting a word representative of transmission parameters respectively allocated to the mobile stations in communication with a base station of a mobile telecommunication system, wherein it includes the step of: including, in each transmission burst a midamble resulting from the sum of selected midambles among all the available midambles, said selection being done by said base station in relation with a word so that the selected midamble corresponds to a binary element of said word equal to a first value and a non-selected midamble corresponds to a binary element of said word equal to a second value, and considering a word the elements of which are in one-to-one relationship with the temporal positions of the estimations respectively corresponding to said available midambles.

4 Claims, 7 Drawing Sheets

U.S. PATENT DOCUMENTS

| | | | |
|---|---|---|---|
| 5,732,352 | A | 3/1998 | Gutowski et al. |
| 5,970,060 | A | 10/1999 | Baier et al. |
| 6,069,884 | A | 5/2000 | Hayashi et al. |
| 6,078,607 | A | 6/2000 | Monroe et al. |
| 6,275,506 | B1 | 8/2001 | Fazel et al. |
| 6,285,666 | B1 | 9/2001 | Suzuki |
| 6,366,569 | B1 | 4/2002 | Ritter |
| 6,381,260 | B1 | 4/2002 | Bahrenburg et al. |
| 6,381,460 | B1 | 4/2002 | Klein et al. |
| 6,424,932 | B1 | 7/2002 | Rumney |
| 6,636,554 | B2 | 10/2003 | Jechoux et al. |
| 6,895,035 | B2 * | 5/2005 | Jechoux et al. ............. 375/141 |

FOREIGN PATENT DOCUMENTS

| | | |
|---|---|---|
| CN | 1227700 A | 9/1999 |
| DE | 197 33 336 | 2/1999 |
| EP | 0 456 625 | 11/1991 |
| EP | 0 920 140 A2 | 6/1999 |
| EP | 0 940 926 A2 | 9/1999 |
| EP | 0 954 111 A1 | 11/1999 |
| EP | 0 991 204 A2 | 4/2000 |
| EP | 1 067 723 A2 | 1/2001 |
| JP | 2001-148641 A | 5/2001 |
| WO | WO 98/07291 | 2/1998 |
| WO | WO 99/21315 | 4/1999 |
| WO | WO 99/40698 | 8/1999 |
| WO | WO 99/60759 | 11/1999 |

OTHER PUBLICATIONS

3GPP TS 25.433 v3.8.0 (Dec. 12, 2001)., 3rd Generation Partnership Project; Technical Specification Group Radio Access Network; UTRAN lub Interface NBAP signalling (Release 1999).

3GPP TS 25.331 v3.9.0 (Dec. 12, 2001)., 3rd Generation Partnership Project; Technical Specification Group Radio Access Network; Radio Resource Control (RRC); Protocal Specification (Release 1999).

B. Steiner, et al., 100 European Transactions on Telecommunications and Related Technologies, vol. 5, No. 1, pp. 39-50, "Optimum and Suboptimum Channel Estimation for the Uplink of CDMA Mobile Radi Systems With Joint Detection", 1994.

* cited by examiner

METHOD AND SYSTEM OF TRANSMITTING WORDS REPRESENTING TRANSMISSION PARAMETERS RESPECTIVELY ALLOCATED TO MOBILE STATIONS COMMUNICATING WITH A BASE STATION IN A MOBILE COMMUNICATION SYSTEM

CROSS REFERENCE TO RELATED APPLICATIONS

This application is a divisional of U.S. application Ser. No. 11/071,317 filed on Mar. 4, 2005, which is a divisional of U.S. Pat. No. 6,895,035 issued date May 17, 2005, which is a divisional of U.S. Pat. No. 6,636,554 issue date Oct. 21, 2003, which is a divisional of PCT/JP01/02133 filed on Mar. 16, 2001, all of which claim priority to European Patent Application No. 00400767.0 filed on Mar. 20, 2000. The contents of each of these documents are incorporated herein by reference.

Method for transmitting a word representative of transmission parameters respectively allocated to the mobile stations in communication with a base station of a mobile telecommunication system

TECHNICAL FIELD

The present invention relates to a method for transmitting a word representative of transmission parameters respectively allocated to the mobile stations in communication with a base station of a mobile telecommunication system.

BACKGROUND ART

The present invention is concerned with mobile telecommunication systems comprising a number of base stations which can communicate with mobile stations. FIG. 1 shows a base station BTS in communication with three mobile stations MST, MS2 and MS3. The communication from a mobile station MSi to the base station BTS is done by means of an up-link UL and the communication from the base station BTS to a mobile station MSi is done by means of a down-link DL.

The present invention is also concerned with telecommunication systems wherein different user signals are separated both in time domain and in code domain. An example of such system is the so called UMTS TDD system or W-CDMA TDD system in which the time domain is represented by the TDD-system component and the code domain by CDMA-system component.

More particularly, in time-domain, transmission is for example organised based on radio frames constituted of a number N (for example N=15) of timeslots. The same frequency is used for both the up-link (Mobile Station to Base Station) and the down-link (Base Station to Mobile Station). Furthermore, a time-separation is used to differentiate the down-link and the up-link such that a subset of the N available timeslots per frame is exclusively allocated for down-link transmission and the remaining ones for up-link transmission. In a frame, at least one timeslot is always allocated for each down-link and up-link.

In such a system, different user's signals can be transmitted in separate timeslots, e.g. N different down-link timeslots are allocated to N different down-link user signals. This is the time-domain of the system. Furthermore, several users signals can also be transmitted within one timeslot by using different spreading codes. This is the code-domain mode of the system.

In such a system, all base stations in an area operate synchronously and generally share the same up-link/down-link timeslot configurations.

In both up-link and down-link, user's data is transmitted in a timeslot arranged in a burst B comprising, as illustrated in FIG. 2, a first data field D1, a general midamble field M and a second data field D2. A midamble is a complex-valued chip sequence and is used by a receive (the base station BTS in the up-link or a mobile station in the down-link) for channel estimation which is needed for the retrieval of the user's signals.

In the up-link, each mobile station MSi sends a different midamble $m^{(i)}$, as the base station BTS needs an individual channel estimation for each mobile station transmitting in a particular timeslot.

Note that when a midamble is not explicitly assigned to a mobile station, a default fixed-allocation rule between its assigned spreading code and a particular midamble is used.

In the down-link shown in FIG. 2, generally just one midamble $m^{(i)}$ is used by the base station BTS for all user's signals within a particular timeslot. The reason is that in the down-link, all users experience just one down-link channel to estimate, e.g. from the base station BTS to itself and ignore those of the other users transmitting in the same timeslot. But in some situation, when more than one channel estimation is needed, more that one midamble can be used by a base station BTS. In this cases, the midamble M results in the summation of all these midambles.

A guard period G can be provided to ensure proper separation in time of consecutive timeslots. Also, signalling bits S can be provided.

In the up-link UL, data of a mobile station MSi is spread to the chip rate by a complex valued spreading code $a_i$ (or the spreading codes) which is (are) affected to this mobile station MSi by the system.

In the down-link DL, each data $d_i$ intended for a mobile station MSi is spread to the chip rate by a corresponding spreading code $a_i$ (in 11 to 1 k on FIG. 2), the results of all these spreading operations being summed (in 20) to form the data D1 and D2 contained in the burst.

A problem occurs when an advanced detection algorithm such as Joint Detection is used for the retrieval of the user's signals at the receiver side. With such an algorithm implemented, data bits from all users transmitting in a timeslot are simultaneously decoded and decided at receiver-side. For optimal performance of the algorithm, the receiver needs to know several parameters, especially spreading codes and channel profiles of all users which are present in a particular timeslot.

Generally, when such an algorithm is implemented at a base station-side, the base station can have a knowledge of the allocated spreading codes because the radio access network to which it belongs controls their usage.

But, the situation is quite different, when the considered algorithm is implemented at the mobile station in the down-link. A mobile station doesn't generally know the other spreading codes which are allocated to the other user's signals simultaneously present in the same timeslot. This fact seriously impacts the implementation of the algorithm, such the Joint-Detection, at mobile station-side.

One first possibility to overcome this problem is to perform a so-called "Blind spreading-code detection" where it is tested for, for instance by despreading and thresh-holding at mobile station-side, if some or all possible spreading codes are used in a particular timeslot.

A second possibility consists in communicating to each mobile station all spreading codes which are currently used by all user's signals present in one particular timeslot. This solution is practicable only if this signalling can be done fast and with only marginal delay. This last constraint especially makes an explicit signalling by multiplexing signalling bits together with the data bits contained in the data fields of a burst not easy to implement.

DISCLOSURE OF INVENTION

It is an object of the present invention to provide a method for a mobile station to determine the transmission parameters, for example the spreading codes, that have been allocated to the other user's signals simultaneously present in the same timeslot in such a way that this method do not present the underlying problem.

It is a further object of the present invention to provide a method which can be performed without any substantial constraint and, hence, which can be done fast and with only marginal delay.

It is a further object of the present invention to provide such a method that can be carried out in mobile telecommunication system designed in such a way that each mobile station in communication with said base station transmits data in bursts including a midamble or a sum of midambles that are affected to said mobile station and that said or each midamble is used for estimating the channel response between said mobile station and said base station, all said available midambles being derived from an unique basic midamble code by retaining only the elements of said basic midamble code which belong to respective predefined windows shifted one relative to another, said estimations being performed by correlating the received signal with a sequence based on said basic midamble code and channel estimation output being in temporal positions in one-to-one relationship with said available midambles.

These objects of the present invention are achieved by a method for transmitting a word representative of transmission parameters respectively allocated to the mobile stations in communication with a base station that includes the step of:

including, when data are transmitted from a base station to a mobile station, in each transmission burst a midamble resulting from the sum of selected midambles among all the available midambles, said selection being done by said base station in relation with a word so that a selected midamble corresponds to a binary element of said word equal to a first value and a non-selected midamble corresponds to a binary element of said word equal to second value, considering, at each mobile station side, after having correlated the signal received by said mobile station with a sequence based on the basic midamble code used during the formation of all said midambles, a word the elements of which are in one-to-one relationship with the temporal positions of the estimations respectively corresponding to said available midambles, an element of said word being equal to said first value when the corresponding position includes an estimation of the channel between the base station and the mobile station and being equal to said second value when the corresponding position doesn't, said word equal to the word to be transmitted enabling said mobile station to have a knowledge of said transmission parameters.

In accordance with an additional feature of the present invention, data of each mobile station in communication with said base station are spread by at least one spreading code which is allocated to said mobile station, said transmission parameters being the spreading codes which has been allocated to the mobile stations in communication with said base station.

In accordance with an additional feature of the present invention, to each element of said word to be transmitted respectively correspond predetermined groups of spreading codes. Advantageously, to each element of said word to be transmitted corresponds one particular spreading code. Or, also advantageously, to each element of said word to be transmitted correspond a node of the tree that is used to form the spreading codes.

In accordance with an additional feature of the present invention, said bursts being transmitted in timeslots, wherein it performs for the bursts of each timeslot independently of the other timeslots.

These objects and advantages of the present invention become obvious to those of ordinary skill in the art after having read the following detailed description of the preferred embodiments which are illustrated in the following drawings in which:

BEST MODE FOR CARRYING OUT THE INVENTION

The present invention proposes to use the midambles to form a word which describes some transmission parameters of signals of each mobile station in communication with a base station.

Figure 1:
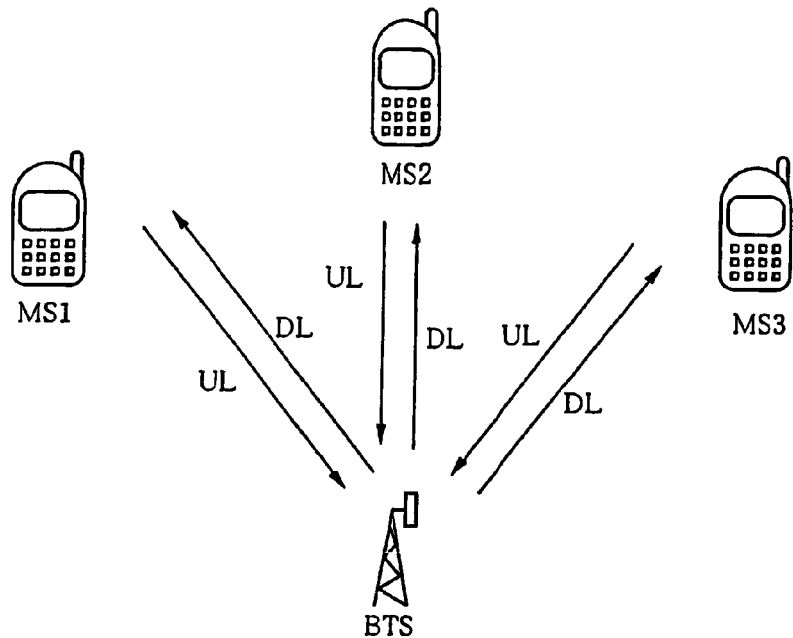
FIG. 1 illustrates up-link and down-link in a telecommunication system for mobile stations, in which the present invention finds application.
Figure 2:
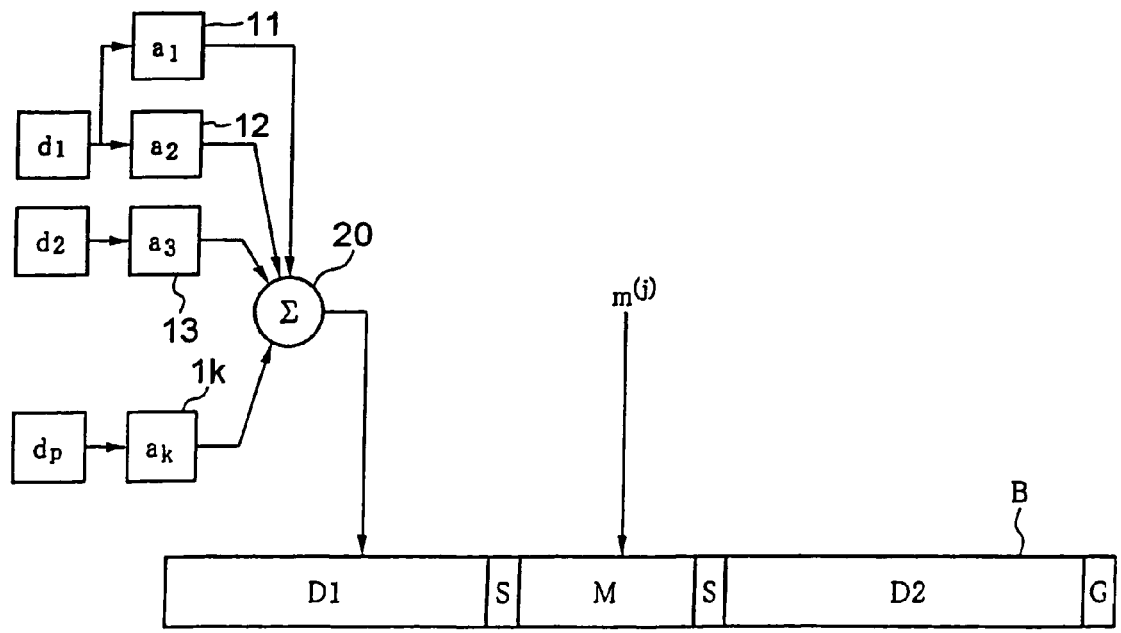
FIG. 2 illustrates the formation of a burst in a base station of a telecommunication system.
Figure 3:
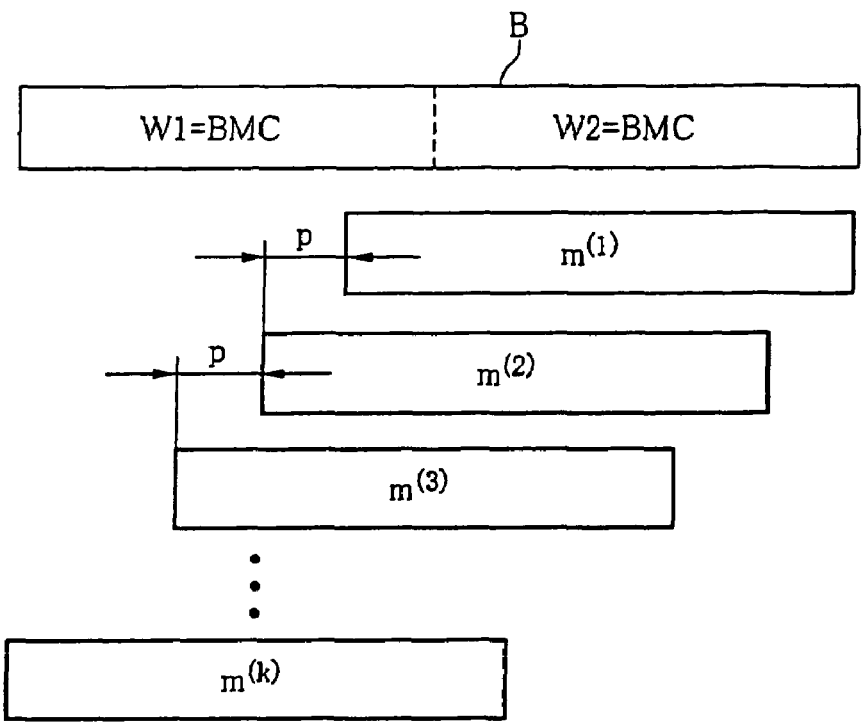
FIG. 3 illustrates the formation of the midambules of a telecommunication system.

The formation of the midambles is first reminded in relation with FIG. 3. The midambles are specific of the users who transmit within the same timeslot. They are all derived from a same basic code BMC, said "basic midamble code". The basic midamble code BMC is concatenated with itself in order to form a bloc B and each specific midamble $m^{(i)}$ (i=1 to k for k users) is derived from the basic midamble code BMC by retaining only the elements of the bloc B which belong to a predefined window. The window corresponding to a specific midamble $m^{(i)}$ is shifted of p elements compared to an adjacent window.

In the up-link, each mobile station MSi sends a midamble $m^{(i)}$ different from the others, as the base station BTS needs an individual channel estimation for each mobile station transmitting in a particular timeslot.

Figure 4:
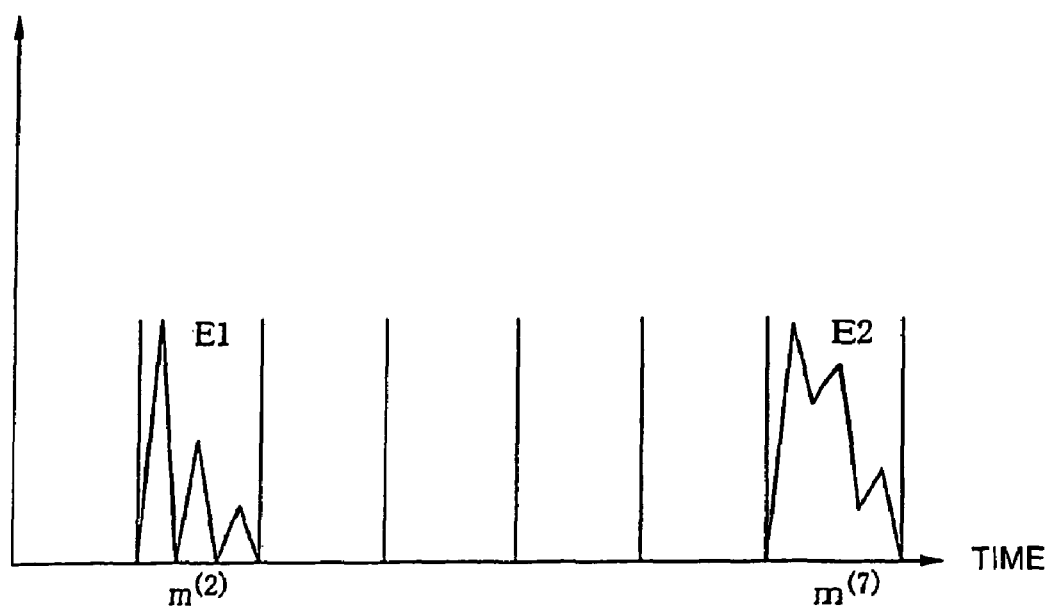
FIG. 4 illustrates an example of the result of a correlation process that is performed at the mobile station sides of a telecommunication system.

When the base station BTS receives a number of bursts transmitted by the mobile stations MS1 to MSk containing each a midamble $m^{(i)}$, a correlation with a special sequence based on the basic midamble code BMC is done and gives a channel estimation output for each of the user transmitting bursts in the same timeslot but in time-distinct windows. This is shown in FIG. 4 in the case of two mobile stations MS1 and MS2 sending two midambles $m^{(2)}$ and $m^{(7)}$. The two channel estimation outputs are referenced E1 and E2.

According to the prior art, in the down-link, generally just one midamble $m^{(i)}$ is used by the base station BTS for all user's signals within a particular timeslot. The reason is that in the down-link, all users experience just one down-link channel to estimate, e.g. from the base station BTS to itself and ignore those of the other users transmitting in the same timeslot. But in some situation, when more than one channel estimations is needed, more that one midambles can be used by a base station BTS.

Figure 5:
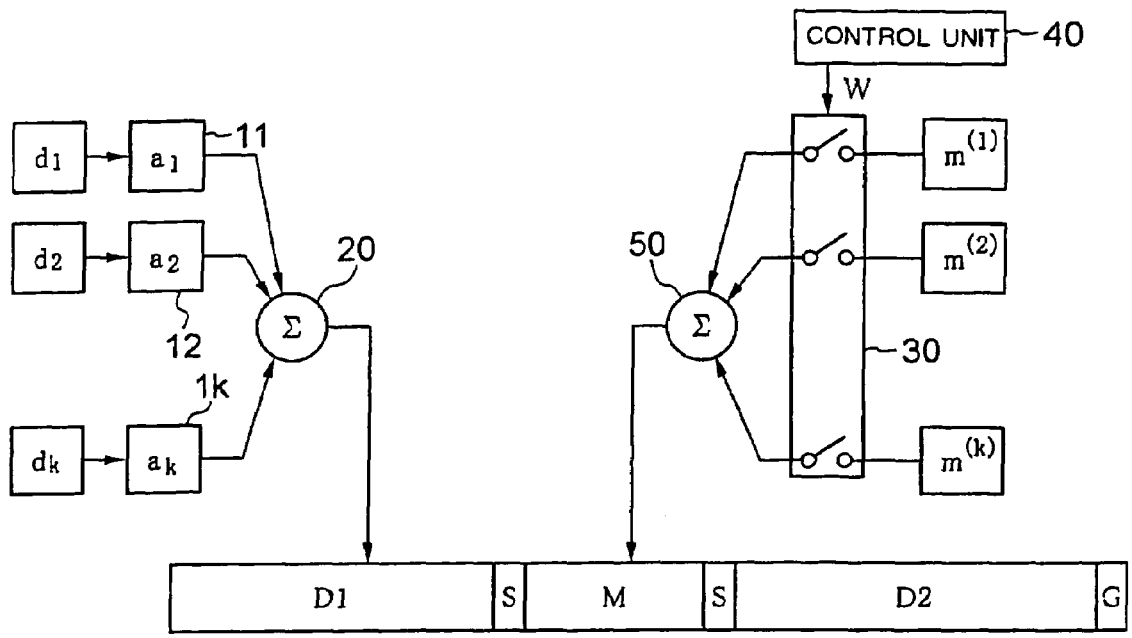
FIG. 5 illustrates the formation of a burst in a base station of a telecommunication system provided to perform a method according to the present invention.

FIG. 5 shows the formation of a burst B according an embodiment of the present invention in a base station BTS communicating with k mobile stations MS1 to MSk. The processing of the spreading code is identical as the one described in the preamble of the present specification. A spreading process is carried out (in 1i) with the data $d_i$ intended for each mobile station i and all thus spread data are summed (in 20) to form the data fields D1 and D2.

Corresponding to each mobile station i, a midamble $m^{(i)}$ is formed according to the method described above in relation with FIG. 3. A selection unit 30 is provided to select some midambles in relation with a word W. The word W has as many elements $w_i$ (i=1 to k) as the number of available midambles $m^{(i)}$ so that one element $w_i$ of the word W corresponds univocally to one midamble $m^{(i)}$: the first element corresponds to the first midamble, the second element corresponds to the second midamble, etc.

A control unit 40 formed the word W so that it describes some transmission parameters of each of the mobile stations MS1 to MSk that are in communication with the base station BTS.

All the selected midambles are summed in a summation unit 50 in order to form the general midamble M of the burst B.

Figure 6:
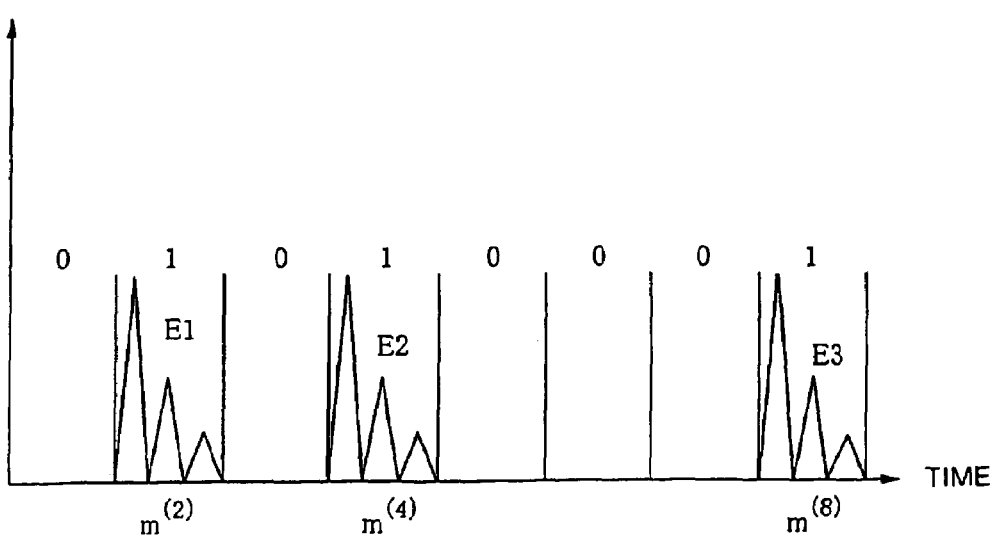
FIG. 6 illustrates an example of the result of a correlation process that is performed at the mobile station sides of a telecommunication system provided to perform a method according to the present invention.

At a mobile station side (one of the mobile station that is in communication with the base station BTS), a correlation with a special sequence based on the basic midamble code BMC used for the formation of the midambles is performed, the result of which is shown in FIG. 6. In FIG. 6, each midamble $m^{(i)}$ selected by the control unit 40 of the base station BTS gives an estimation output that is positioned according to the shift of this midamble $m^{(i)}$. In particular, in FIG. 6, the control unit 40 has selected the midamble $m^{(2)}$, $m^{(4)}$ and $m^{(8)}$ and three estimation outputs E1, E2 and E3 appear respectively in the second position, the fourth position and the eighth position.

Note that the estimation outputs E1, E2 and E3 appearing as a result of the correlation process are identical since they concern the sole down-link DL.

Always at the mobile station side, a word Wr is built up as follows. At a given position, when an estimation output appears, a binary information that is equal to a first value, for example 1, is considered and when it does not, a binary information that is equal to a second value, for example 0, is considered. The word Wr is the concatenation of the binary information corresponding to all the positions. At FIG. 6, the word Wr can be written 01010001.

As each element $w_{ri}$ of the word Wr corresponds to a midamble $m^{(i)}$ and as each element $w_i$ of the word W corresponds also to the same midamble $m^{(i)}$, it can be understood that the word Wr is equal to the word W. Therefore, the word Wr describes the transmission parameters of each of the mobile stations MS1 to MSk that are in communication with the base station BTS and transmit signals in the same timeslot as the word W does. Each user in this way gets informed which transmission parameters, for example spreading codes, (besides those which are used by himself) are currently used in the current timeslot and this information can be taken as input for a detection algorithm, improving its performing and its efficiency.

The transmission parameters described by the words W and Wr are advantageously, for a mobile station MSi, representative of an information concerning the spreading code $a_i$ it uses. An association is made between presence/absence of a particular midamble (which gives the word W) and presence/absence of a particular spreading code. This association is called "association rule" in the following.

Figure 7:
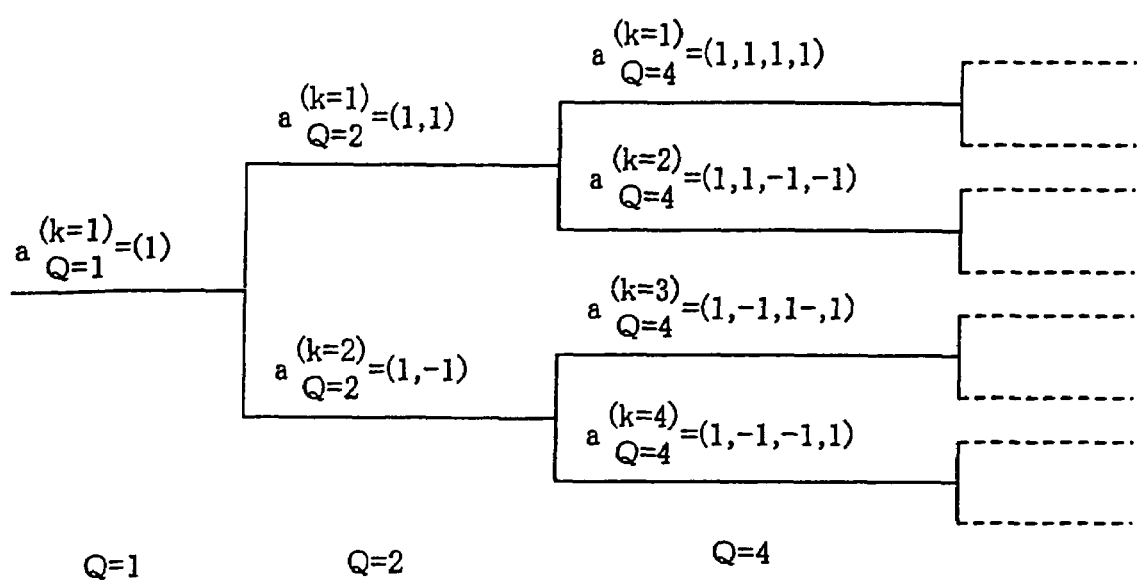
FIG. 7 illustrates the formation of the spreading codes in a telecommunication system.

The generation of the spreading codes is now reminded in relation with FIG. 7. Each level in a code tree defines a spreading factor indicated by a value Q (Q=1, Q=2, Q=4, etc.). For each value of the spreading factor Q and for an user k, the spreading codes $a^k_Q$ is defined having Q chips and being orthogonal to the other spreading codes of the same level.

The spreading codes are allocated to the users in a same timeslot by using the following rules. A code can be used in a timeslot if and only if no other code on the path from the specific code to the root of the tree or in the sub-tree below the specific code is used in this timeslot. These rules imply that the number of available codes in a timeslot is generally not fixed, but rather depends on the number of spreading codes and the spreading factors allocated to all users signals in the same timeslot.

Specifically, in the CDMA-TDD system described above, only spreading factors Q of 16 or 1 are allowed in the down-link. Hence, either only one spreading code, e.g. $a^{(k=1)}_{Q=1}$ is allocated in one timeslot, or up to 16 different spreading codes $a^{(k)}_{Q=16}$, for the users k=1, ..., 16.

Association rules are now described. In case of a number of available midambles equal to the number of spreading codes allocated, the association rule is: the absence/presence of a given midamble corresponds to the absence/presence of a given spreading code in the corresponding timeslot.

In case of a number of available midambles even submultiple of the number of spreading codes, the association rule is: the absence/presence of a given midamble corresponds to the absence/presence of at least one of the spreading codes that have a common node at spreading factor equal to the number of available midambles.

In all other cases, the absence/presence of a given midamble corresponds to the absence/presence of at least one of the spreading codes which have been grouped together to form a group of spreading code.

To ensure that channel estimation can still be done by a mobile station even if it does not currently receive any data bits and even if no spreading code is used in the corresponding timeslot, either no midamble or just at least one default midamble(s) shall be sent. In any case a mobile station will not perform any detection algorithm.

When more than one channels are used in the down-link (for example when two or more antennas are used), the quantity of possible midambles can be split up equally between the channels. For example, when two channels are used, uneven midambles $m^{(1)}$, $m^{(3)}$, $m^{(5)}$, ... are exclusively used by the first channel and even midambles $m^{(2)}$, $m^{(4)}$, $m^{(6)}$, ... by the second channel. In the W-CDMA TDD-system, a mobile station at switch-on always gets informed by the network about the eventual use of more than one channel in the down-link.

No ambiguity is present in case that there is only one user with spreading code $a^{(k=1)}{}_{Q=1}$ in the DL timeslot, as the user itself knows that he is the only one.

Different association rules are now proposed in the scope of the CDMA-TDD system for different possible cases of type of midambles and number K of possible users with these midambles.

In the W-CDMA TDD-system, there are two types of midambles: long midambles, also said type 1 midambles, and short midambles, also said type 2 midambles. In general, different cells use different basic midambles codes for deriving user-specific long or short midambles in a timeslot. The length of the available channel estimation window per user is influenced by the number of users, e.g. shifts per timeslot and vice versa. Basically, the following parameters are valid in the W-CDMA TDD system: long midambles allow up to 8 or 16 different users and short midambles allow up to 3 or 6 different users.

Examples of particular association rules are now given, in the scope of the W-CDMA TDD system.

Figure 8:
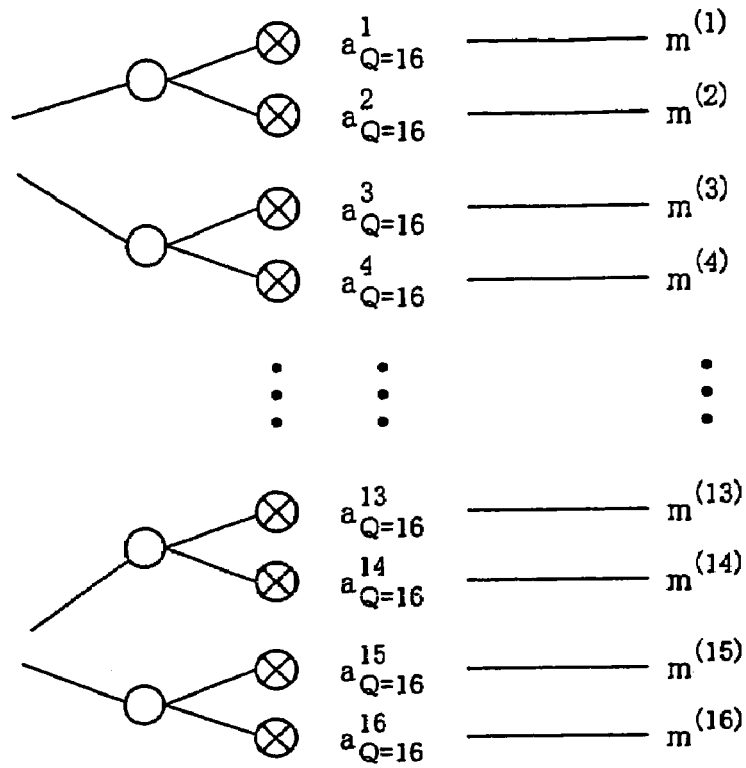
FIGS. 8 to 11 illustrates examples of association rules according the present invention.

The case of midamble type 1 wherein 16 midambles are authorised for deriving a midamble from the basic midamble code is shown in FIG. 8 where it can be seen that each of the 16 possible spreading codes with spreading factor 16 can be indicated by one of the 16 possible midambles. In FIG. 8, each node in the spreading codes tree that is marked with a cross correspond to a midamble.

If for instance spreading codes $a^{(k=2)}{}_{Q=16}$, $a^{(k=5)}{}_{Q=16}$ and $a^{(k=9)}{}_{Q=16}$ would be used by the users allocated to the timeslot, midambles $m^{(2)}$, $m^{(5)}$ and $m^{(9)}$ would be transmitted for channel estimation in the down-link and indicate in the same time the presence of the above-mentioned spreading codes.

Note that the association rule displayed in FIG. 8 is only one (the simplest one ...) out of all the possible mapping schemes between spreading codes and shifts.

Figure 9:
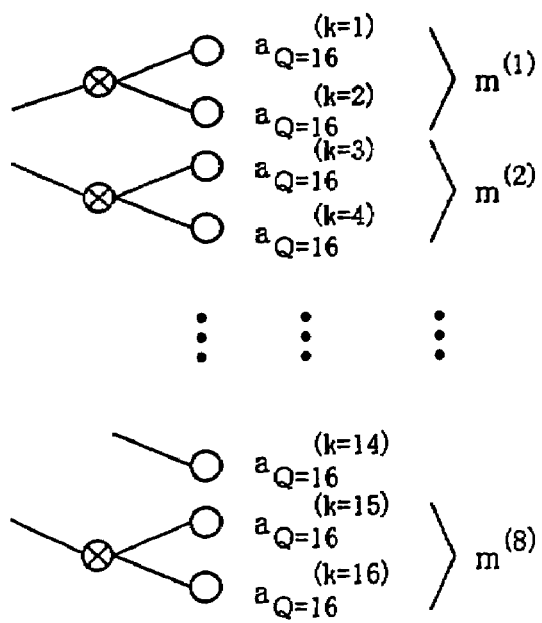

The case of midamble type 1 wherein 8 midambles are authorised for deriving a midamble from the basic midamble code is shown in FIG. 9 where it can be seen that the 16 possible spreading codes with spreading factor 16 can be indicated pair-wise by 1 of the 8 possible midambles. In this case, the granularity is said to be two. In FIG. 9, each of the 8 nodes in the tree at spreading factor 8 that is marked with a cross corresponds to one of the 8 possible midambles.

If for instance spreading codes $a^{(k=2)}{}_{Q=16}$, $a^{(k=5)}{}_{Q=16}$ and $a^{(k=9)}{}_{Q=16}$ would be used by the users allocated to the timeslot, midambles $m^{(1)}$, $m^{(3)}$ and $m^{(5)}$ would be transmitted for channel estimation in the down-link and indicate in the same time the presence of the above-mentioned spreading codes. Even with granularity of 2, the above scheme still provides information about the used spreading factors in the timeslot to the detection algorithm.

Figure 10:
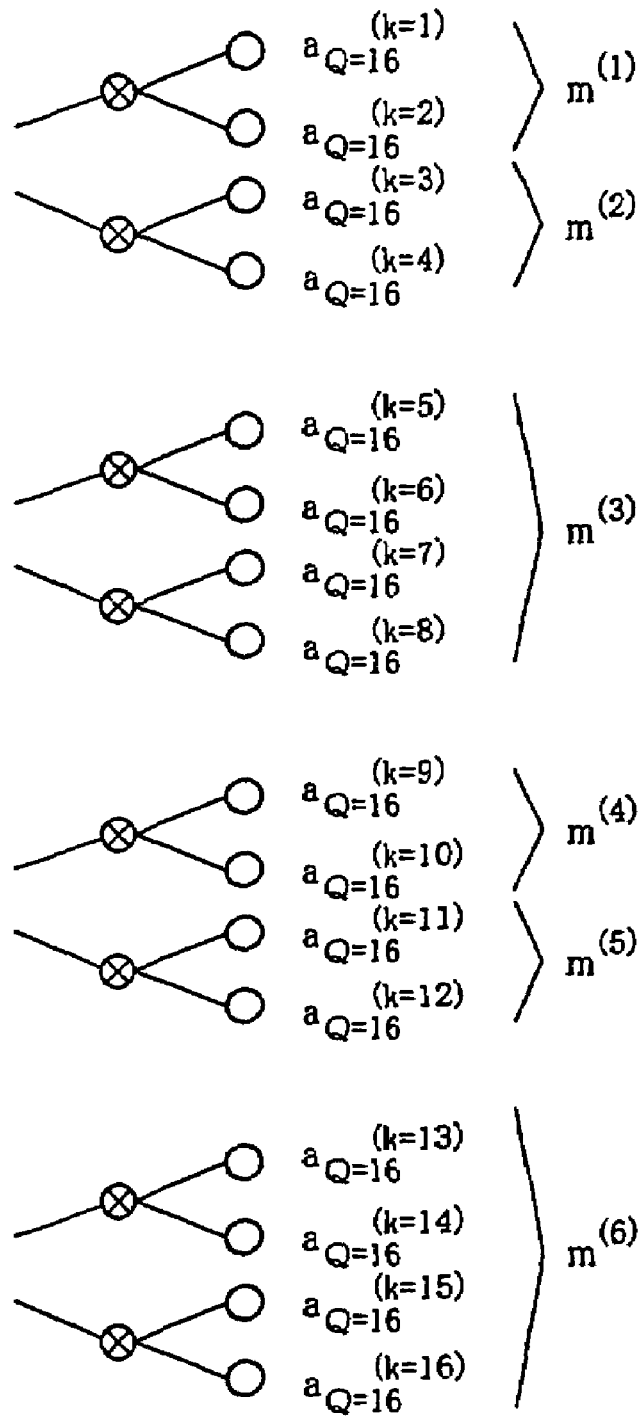

The case of midamble type 2 wherein 6 midambles are authorized for deriving a midamble from the basic midamble code, is shown in FIG. 10 where it can be seen that 8 of the 16 possible spreading codes with spreading factor 16 are grouped pair-wise and correspond to 4 midambles $m^{(1)}$, $m^{(2)}$, $m^{(4)}$ and $m^{(5)}$ and the 8 others are grouped by four and correspond to 2 midambles $m^{(3)}$ and $m^{(6)}$. The granularity would be then equal to 2 and 4.

If for instance spreading codes $a^{(k=2)}{}_{Q=16}$, $a^{(k=5)}{}_{Q=16}$ and $a^{(k=9)}{}_{Q=16}$ would be used by the users allocated to the timeslot, midambles $m^{(1)}$, $m^{(3)}$ and $m^{(4)}$ would be transmitted for channel estimation in the down-link and indicate in the same time the presence of the above-mentioned spreading codes. The granularity would be then equal to 4.

Another example for an association rule in this particular case would be to indicate by means of only 4 among the available 6 midambles the 4 nodes corresponding to spreading factors 4.

Even with granularity of 2 and 4 respectively, the above scheme still provides valuable information about the used spreading factors in the timeslot.

Figure 11:
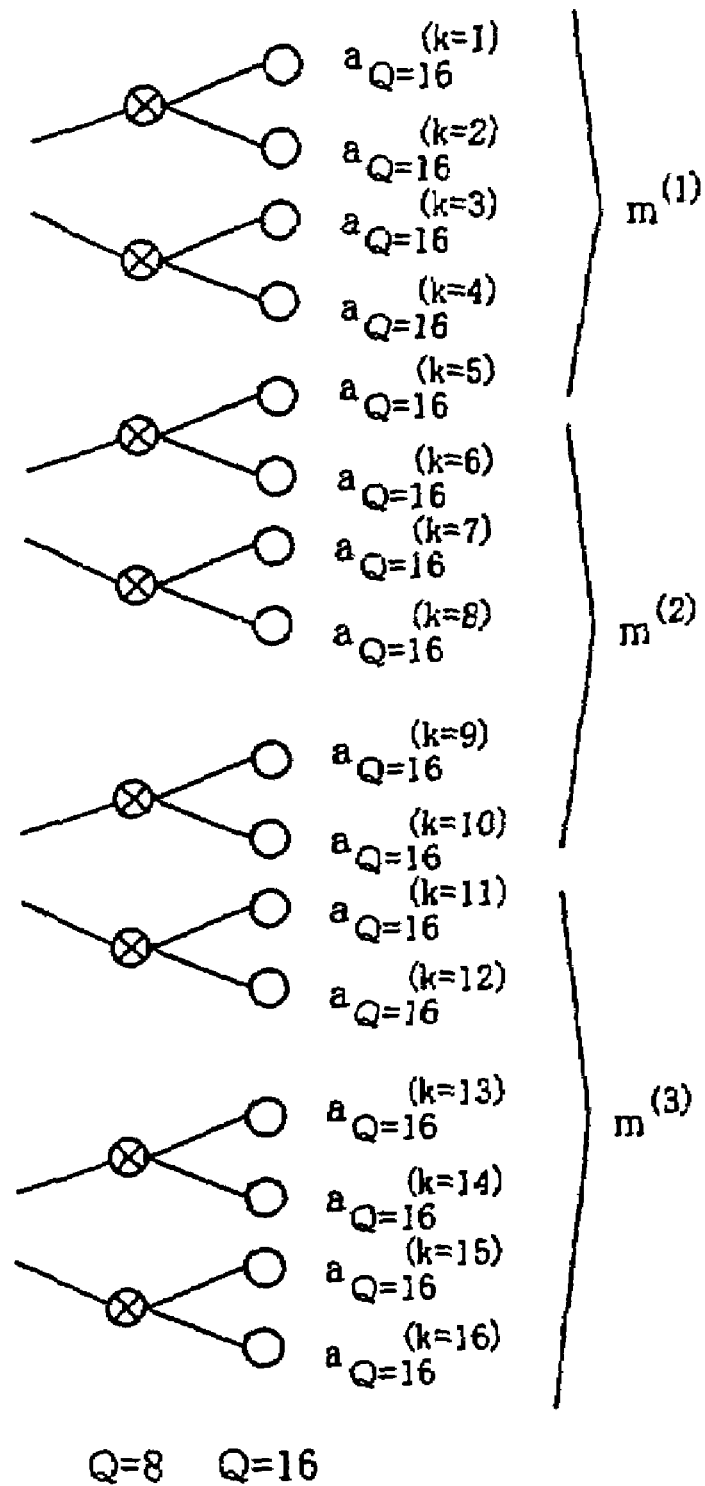

The case of midamble type 2 and wherein 3 midambles are authorised for deriving a midamble from the basic midamble code is shown in FIG. 11 where it can be seen that 10 spreading codes are grouped in two groups of five codes to which corresponds two midambles $m^{(1)}$ and $m^{(2)}$ and the 6 remaining form a group to which corresponds the third midamble $m^{(3)}$.

The granularity of this last example is 5 and 6.

INDUSTRIAL APPLICABILITY

The advantage of this invention is that it will in any case reduce the number of spreading codes amongst which the so called Blind Spreading Code Detection has to be performed. For example for midamble type 1 wherein 8 midambles are possible, the Blind Spreading Code Detection has to be performed on 2 codes only instead of 16.

Complexity of baseband processing at network and mobile station side is only slightly increased. Especially the capability to process up to K midambles will always be implemented in the W-CDMA TDD-system at the mobile station side and at the base station side.

What is claimed is:

1. A mobile telecommunication system, comprising:
   a base station; and
   at least one mobile station in communication with the base station, wherein
   the mobile station is configured to receive a binary word transmitted from the base station,
   the base station is configured to select one or more midambles from a set of available midambles in accordance with a value of a binary element of a binary word representative of at least one transmission parameter allocated to the at least one mobile station,
   said available midambles are shifted versions of a basic midamble, and said base station further is configured to transmit the selected one or more midambles as being representative of said binary word,
   the binary word having as many binary elements as a number of available midambles, each binary element of the binary word corresponding to each of the available midambles on a one-to-one basis, and
   the presence of a particular midamble to be selected from the set of available midambles is indicated when the value of the binary element of the binary word representing information about spreading codes corresponds to the particular midamble is equal to 1, while absence of a particular midamble to be selected is indicated when the value of the binary element corresponding to the particular midamble is equal to 0.

2. A method of communicating information representative of at least one transmission parameter allocated to at least one mobile station in communication with a base station, comprising:
   receiving at the at least one mobile station a binary word transmitted from the base station;
   selecting by the base station one or more midambles from a set of available midambles in accordance with a value of a binary element of a binary word representative of at least one transmission parameter allocated to the mobile station, wherein said available midambles are shifted versions of a basic midamble; and transmitting by said base station the selected one or more midambles as being representative of said binary word, the binary word having as many binary elements as a number of available midambles, each binary element of the binary word corresponding to each of the available midambles on a one-to-one basis, and the presence of a particular midamble to be selected from the set of available midambles is indicated when the value of the binary element of the binary word representing information about spreading codes corresponds to the particular midamble is equal to 1, while absence of a particular midamble to be selected is indicated when the value of the binary element corresponding to the particular midamble is equal to 0.

3. A mobile station of mobile telecommunication system that includes a base station in communication with said mobile station, comprising:

a receiver configured to receive a binary word transmitted from the base station; and a processor configured to process said received binary word, wherein one or more midambles is selected by the base station from a set of available midambles in accordance with a value of a binary element of a binary word representative of at least one transmission parameter allocated to the mobile station, said available midambles are shifted versions of a basic midamble, and the selected one or more midambles are transmitted by said base station as being representative of said binary word, the binary word having as many binary elements as a number of available midambles, each binary element of the binary word corresponding to each of the available midambles on a one-to-one basis, and the presence of a particular midamble to be selected from the set of available midambles is indicated when the value of the binary element of the binary word representing information about spreading codes corresponds to the particular midamble is equal to 1, while absence of a particular midamble to be selected is indicated when the value of the binary element corresponding to the particular midamble is equal to 0.

4. A method of communicating information representative of at least one transmission parameter allocated to at least one mobile station in communication with a base station, comprising:

receiving at the at least one mobile station a binary word transmitted from the base station; and processing the received binary word, wherein one or more midambles is selected by the base station from a set of available midambles in accordance with a value of a binary element of a binary word representative of at least one transmission parameter allocated to the mobile station, wherein said available midambles are shifted versions of a basic midamble; and the selected one or more midambles is transmitted by the base station as being representative of said binary word, the binary word having as many binary elements as a number of available midambles, each binary element of the binary word corresponding to each of the available midambles on a one-to-one basis, and the presence of a particular midamble to be selected from the set of available midambles is indicated when the value of the binary element of the binary word representing information about spreading codes corresponds to the particular midamble is equal to 1, while absence of a particular midamble to be selected is indicated when the value of the binary element corresponding to the particular midamble is equal to 0.

* * * * *